Oct. 31, 1950  N. R. KRAUSE  2,528,232
FEED PLATE FOR COMBINES
Filed April 28, 1945  2 Sheets-Sheet 1

Inventor:
Norman R. Krause
By Thiess, Olson & Mecklenburger
Attys.

Oct. 31, 1950      N. R. KRAUSE      2,528,232
FEED PLATE FOR COMBINES
Filed April 28, 1945      2 Sheets-Sheet 2
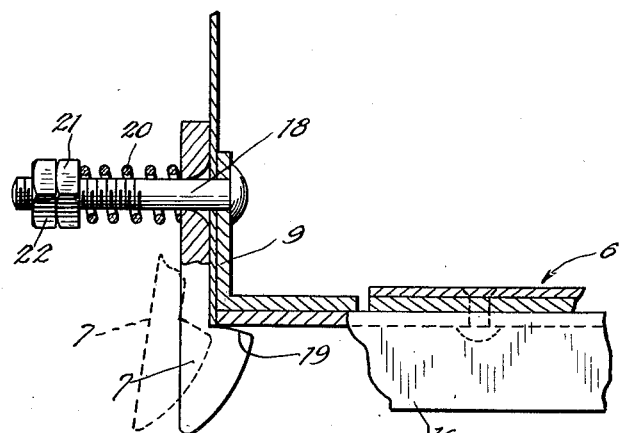
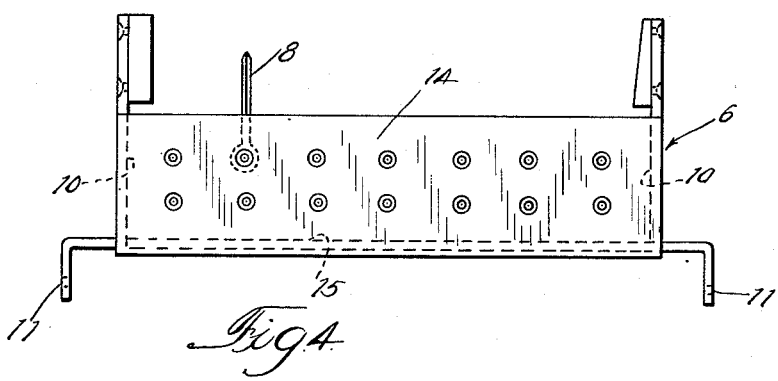
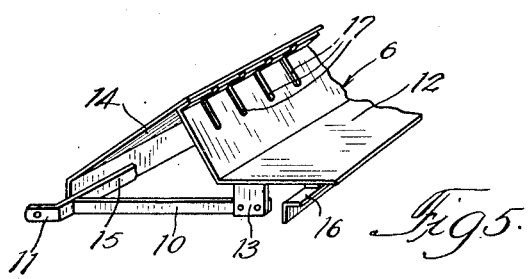

Patented Oct. 31, 1950

2,528,232

UNITED STATES PATENT OFFICE 2,528,232

FEED PLATE FOR COMBINES

Norman R. Krause, Racine, Wis., assignor to J. I. Case Company, Racine, Wis., a corporation of Wisconsin Application April 28, 1945, Serial No. 590,881

11 Claims. (Cl. 130—27)

My invention relates to feed plates for combines.

One of the objects of my invention is to provide a feed plate in front of the cylinder of a combine which will act as a safety device to prevent foreign material from getting into the cylinder.

A further object of my invention is to provide a feed device in front of the cylinder which will enable ready access to the cylinder for cleaning out material which may be clogging up the entrance to the cylinder.

A further object is to provide an improved feed device which will break up stiff weeds, and the like, prior to their engagement by the cylinder and which will comb and straighten out bunched material in front of the cylinder.

Further objects and advantages of the invention will be apparent from the description and claims.

In the drawings, in which an embodiment of my invention is shown,

Fig. 3 is a detail sectional view on the line 3—3 of Fig. 1, showing the latch for the hinged feed plate;

Fig. 4 is a plan view of part of the feed plate; and

Fig. 5 is a perspective view of the feed plate.

Figure 1:
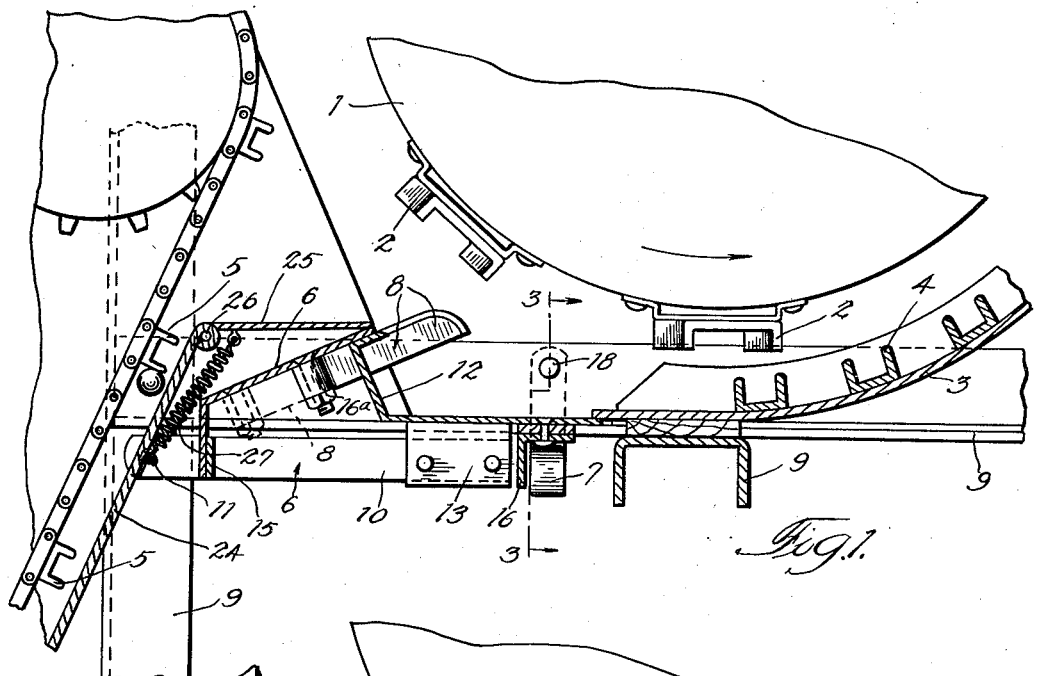
Figure 1 is a vertical sectional elevation showing the cylinder concave and feed plate in operative position.
Figure 2:
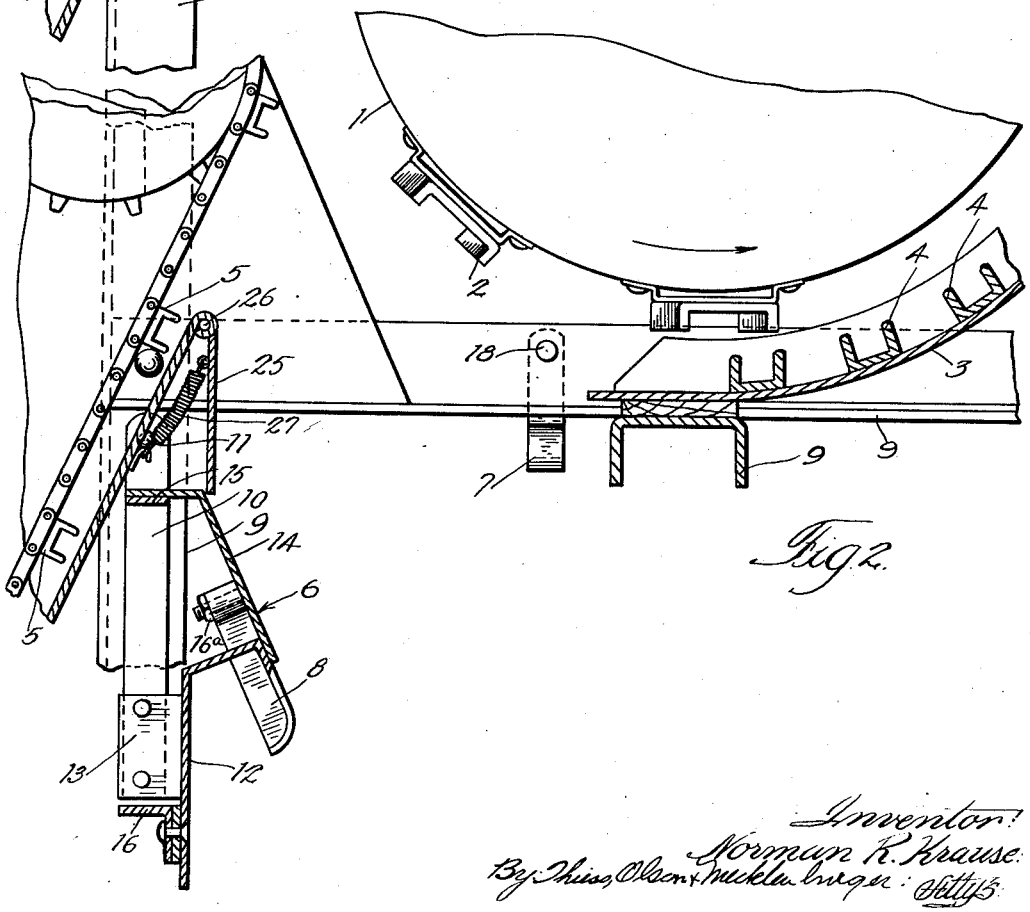
Fig. 2 is a view similar to Fig. 1 but showing the feed plate dropped down to inoperative position.

Referring to the drawings in detail, the construction shown comprises the cylinder 1, having grain engaging bars 2 secured thereto, the concave 3 cooperating with the cylinder provided with the concave bars 4, a feeder rake 5 for carrying the cut grain rearwardly and upwardly and delivering it to the cylinder, and a hinged feed plate 6 between the feeder and the cylinder provided with a pair of spring latches 7 which will be released by abnormal pressure on the feed plate to enable it to be dropped down from the position shown in Fig. 1 to the position shown in Fig. 2. This abnormal pressure might be occasioned by the picking up of foreign material such as rocks, or the like, carried up by the feeder, which would be delivered between the cylinder and the comb or knives 8 on the feed plate 6 and would cause the feed plate to be forced downwardly, forcing the spring latch 7 from the position shown in full lines in Fig. 3 to the position shown in dotted lines, thus enabling the feed plate to drop down to the position shown in Fig. 2.

The concave and feed plate are mounted on a suitable structural framework 9 forming part of the combine. The feed plate 6 comprises a pair of side arms 10, pivotally mounted on the post 9 at 11, a rear plate 12 provided with downturned ears 13 secured to these arms, and a front plate 14 secured to a crossbar 15 extending between these arms. The rear edge of the rear plate has secured thereto a transversely extending angle iron 16, the ends of which are engaged, respectively, by the two swingably mounted latch members 7 shown in Fig. 3. In order to smoothen and straighten out any bunched cut material and break up stiff weeds, or the like, a set of knives or teeth 8 are secured to the front plate 14 by means of bolts and nuts 16ª and extend rearwardly through positioning slots 17 in the rear plate into the space between the feed plate 6 and the cylinder. If it is not desired to use these knives, they may be set in the dotted line rear position shown in Fig. 1, where they will be out of the way.

The latch 7, shown in detail in Fig. 3, comprises a latch member rockably mounted on a bolt 18 secured to the side frame angle 9 having an inwardly and downwardly sloping latch face 19 engageable with the under side of the transversely extending angle bar 16 on the feed plate. In order to hold the latch in latching position, a coil compression spring 20 is provided, one end of which bears on the latch member 7 and the other of which bears on a nut 21 held in position on the end of the bolt 18 by a lock nut 22. The slope of the engaging face 19 of the latch is such that a predetermined abnormal pressure on the feed plate will force the latch to the left, as viewed in Fig. 3, to the dotted-line unlatching position, thus allowing the feed plate to drop down.

If the space between the feed plate and cylinder should be clogged up or if, for any reason, it should be desirable to obtain access to the space in front of the cylinder, the latches 7 may be manually released to enable the feed plate to drop down out of the way.

The conveyor chute 24 of the feeder swings when the feeder is raised and lowered, swinging about the axis of the upper feed rake sprocket. This results in a varying space between the floor 24 and plate 14. This is bridged by a sealing flap 25 hinged in a substantially grain-tight manner at 26 to the floor 24 and held down in sliding engagement with the plate 14 by means of a spring 27. The sealing flap 25 follows the plate 14, moving from the position shown in Fig. 1 to the position shown in Fig. 2 when the plate 14 is dropped.

Further modifications will be apparent to those skilled in the art and it is desired, therefore, that the invention be limited only by the scope of the appended claims.

Having thus described my invention, what I claim and desire to secure by Letters Patent is:

1. In a combine, the combination with a cylinder, a concave cooperating therewith and means for feeding cut grain to the cylinder, of a feed plate in front of said cylinder and concave for delivering the cut grain from the feeder to the cylinder, mounted for movement toward and from the cylinder, and latch means for holding said feed plate in fixed operative position releasable by abnormal pressure on the feed plate to enable the feed plate to move away from the cylinder and remain away from the cylinder when in inoperative position, said combine having an opening for the release of foreign material, closed by movement of said plate toward said cylinder.

2. In a combine, the combination with a cylinder, a concave cooperating therewith and means for feeding cut grain to the cylinder, of a feed plate in front of said cylinder and concave for delivering the cut grain from the feeder to the cylinder, mounted for movement toward and from the cylinder, held away from said cylinder when in inoperative position and held in definite fixed position when in use, and a plurality of teeth fixedly secured to said feed plate extending from the rear edge thereof toward the cylinder for smoothening and straightening out the cut grain as it is fed to the cylinder, said combine having an opening for the release of foreign material, closed by movement of said plate toward said cylinder.

3. In a combine, the combination with a cylinder, a concave cooperating therewith, and means for feeding cut grain to the cylinder, of a feed plate in front of said cylinder and concave for delivering the cut grain from the feeder to the cylinder, mounted for movement toward and from the cylinder, a plurality of teeth secured to said feed plate extending from the rear edge thereof toward the cylinder for smoothening and straightening out the cut grain as it is fed to the cylinder, said teeth when in position for use being so inclined as to facilitate the removal of the cut grain in said smoothening and straightening action and being so spaced from said cylinder as not to obstruct materially the passage of the grain between the cylinder and teeth, and means for holding said feed plate in fixed operative position, releasable to enable the feed plate to move away from the cylinder and remain away from the cylinder when in inoperative position, said combine having an opening for the release of foreign material, closed by movement of said plate toward said cylinder.

4. In a combine, the combination with a cylinder, a concave co-operating therewith, and means for feeding cut grain to the cylinder, of a feed plate in front of said cylinder and concave for delivering the cut grain from the feeder to the cylinder, mounted for movement toward and from said cylinder, held away from the cylinder when in inoperative position, and held in definite fixed position when in use, a plurality of teeth secured to said feed plate extending from the rear edge thereof toward the cylinder, said teeth presenting upwardly directed sharpened edges for cutting any material of excessive length inadvertently presented to the cylinder and when in position for use being held in fixed position so inclined as to facilitate the removal of the cut grain therefrom by said cylinder and being so spaced from said cylinder as not to obstruct materially the passage of grain between the cylinder and teeth, said combine having an opening for the release of foreign material closed by movement of said plate toward said cylinder.

5. In a combine, the combination with a cylinder, a concave co-operating therewith, and means for feeding cut grain to the cylinder, of a feed plate in front of said cylinder and concave for delivering the cut grain from the feeder to the cylinder, mounted for movement toward and from said cylinder, held away from the cylinder when in inoperative position, and held in definite fixed position when in use, a plurality of teeth secured to said feed plate extending from the rear edge thereof toward the cylinder, and said teeth being adjustable into an inoperative position beneath the plate when not needed and when in position for use being held in fixed position so inclined as to facilitate the removal of the cut grain therefrom by said cylinder and being so spaced from said cylinder as not to obstruct materially the passage of grain between the cylinder and teeth, said combine having an opening for the release of foreign material closed by movement of said plate toward said cylinder.

6. In a combine, the combination with a cylinder, a concave co-operating therewith, and means for feeding cut grain to the cylinder, of a feed plate in front of said cylinder and concave for delivering the cut grain from the feeder to the cylinder, mounted for movement toward and from said cylinder, held away from the cylinder when in inoperative position, and held in definite fixed position when in use, a plurality of teeth secured to said feed plate extending from the rear edge thereof toward the cylinder, said teeth presenting upwardly directed sharpened edges for cutting any material of excessive length inadvertently presented to the cylinder, and being adjustable into an inoperative position beneath the plate when not needed and when in position for use being held in fixed position so inclined as to facilitate the removal of the cut grain therefrom by said cylinder and being so spaced from said cylinder as not to obstruct materially the passage of grain between the cylinder and teeth, said combine having an opening for the release of foreign material closed by movement of said plate toward said cylinder.

7. In a combine, the combination with a cylinder, a concave cooperating therewith and means for feeding cut grain to the cylinder, of a feed plate in front of said cylinder and concave for delivering the cut grain from the feeder to the cylinder, mounted for movement toward and from the cylinder, and latch means for holding said feed plate in fixed operative position releasable by abnormal pressure on said feed plate to enable the feed plate to move away from the cylinder and remain away from the cylinder when in inoperative position, said combine having an opening for the release of foreign material, closed by movement of said plate toward said cylinder, said feed plate being mounted to swing about an axis adjacent its front edge.

8. In a combine, the combination with a cylinder, a concave cooperating therewith and means for feeding cut grain to the cylinder, of a feed plate for delivering the cut grain from the feeder to the cylinder, mounted for movement toward and from the cylinder, means for holding said feed plate in fixed operative position releasable to enable the feed plate to move away from the cylinder, said combine having an opening for the release of foreign material, closed by movement of said plate toward said cylinder, said feed plate being mounted to swing about an axis adjacent its front edge, and a flap swingable about an axis adjacent its front edge and parallel to said first axis and having its rear edge resting slidably on said feed plate.

9. In a combine, the combination with a cylinder, a concave cooperating therewith and means for feeding cut grain to the cylinder, of a feed plate in front of said cylinder and concave for delivering the cut grain from the feeder to the cylinder, mounted for movement toward and from the cylinder, and latch means for holding said feed plate in fixed operative position releasable by abnormal pressure on said feed plate to enable the feed plate to move away from the cylinder, said combine having an opening for the release of foreign material, closed by movement of said plate toward said cylinder, said feed plate being mounted to swing about an axis adjacent its front edge, said latch means comprising a pair of latches adjacent opposite ends of said feed plate and engaging underneath the feed plate.

10. In a combine, the combination with a cylinder, a concave cooperating therewith and means for feeding cut grain to the cylinder comprising a conveyor chute rockably mounted in front of said cylinder and concave, of a feed plate for guiding the cut grain from the feeder to the cylinder, mounted for movement toward and from the cylinder, means for holding said feed plate in operative position, said combine having an opening for the release of foreign material, closed by movement of said plate toward said cylinder, and a guide plate for bridging between said chute and feed plate having its forward edge pivotally mounted on said chute adjacent the upper end thereof and its rear edge resting on said feed plate.

11. In a combine, the combination with a cylinder, a concave cooperating therewith and means for feeding cut grain to the cylinder comprising a conveyor chute rockably mounted in front of said cylinder and an under-feed endless conveyor element operating in said chute, of a feed plate for guiding the cut grain from the feeder to the cylinder, mounted for movement toward and from the cylinder, means for holding said feed plate in operative position, said combine having an opening for the release of foreign material, closed by movement of said plate toward said cylinder, and a guide plate for bridging between said chute and feed plate having its forward edge pivotally mounted on said chute adjacent the upper end thereof and its rear edge resting on said feed plate.

NORMAN R. KRAUSE.

REFERENCES CITED

The following references are of record in the file of this patent:

UNITED STATES PATENTS

| Number | Name | Date |
|---|---|---|
| 57,541 | Melick | Aug. 28, 1866 |
| 114,974 | Royer | May 16, 1871 |
| 285,422 | Lockhart | Sept. 25, 1883 |
| 316,587 | Walker | Apr. 28, 1885 |
| 447,032 | Landis | Feb. 24, 1891 |
| 507,771 | Wilson | Oct. 31, 1893 |
| 552,275 | Conner | Dec. 31, 1895 |
| 826,988 | Bradbury | July 24, 1901 |
| 1,176,257 | Velcansky | Mar. 21, 1916 |
| 2,286,545 | Hoehn | June 16, 1942 |
| 2,305,159 | Heckman et al. | Dec. 15, 1942 |
| 2,383,911 | Dray | Aug. 28, 1945 |